United States Patent [19]
Bush et al.

[11] Patent Number: 5,842,340
[45] Date of Patent: Dec. 1, 1998

[54] METHOD FOR CONTROLLING THE LEVEL OF OXYGEN STORED BY A CATALYST WITHIN A CATALYTIC CONVERTER

[75] Inventors: Kevin J. Bush, Northville; Bruce A. Church, Dearborn; David Frankowski, Woodhaven; Darren A. Schumacher, Ypsilanti; Michael Badalament, Ann Arbor, all of Mich.

[73] Assignee: Motorola Inc., Schaumberg, Ill.

[21] Appl. No.: 806,179

[22] Filed: Feb. 26, 1997

[51] Int. Cl.$^6$ .................................................. F01N 3/00
[52] U.S. Cl. .............................. 60/274; 60/276; 60/285
[58] Field of Search .............................. 60/274, 276, 285

[56] References Cited

U.S. PATENT DOCUMENTS

| | | | |
|---|---|---|---|
| 4,029,061 | 6/1977 | Asano | 60/285 |
| 4,628,884 | 12/1986 | Geering et al. . | |
| 5,092,123 | 3/1992 | Nada et al. | 60/274 |
| 5,265,417 | 11/1993 | Visser et al. . | |
| 5,289,678 | 3/1994 | Grutter . | |
| 5,293,740 | 3/1994 | Heppner et al. | 60/285 |
| 5,335,538 | 8/1994 | Blischke et al. | 73/118.1 |
| 5,351,484 | 10/1994 | Wade . | |
| 5,357,751 | 10/1994 | Orzel . | |
| 5,357,753 | 10/1994 | Wade . | |
| 5,363,646 | 11/1994 | Orzel et al. . | |
| 5,390,490 | 2/1995 | Brooks | 60/276 |
| 5,487,269 | 1/1996 | Atanasyan et al. . | |
| 5,503,134 | 4/1996 | Delosh et al. . | |

OTHER PUBLICATIONS

"A Review of the Dual EGO Sensor Method for OBD–II Catalyst Efficiency Monitoring," Jeffery . Hepburn, et al., Ford Motor Co. Fuels & Lubricants Meeting & Expo., Baltimore Maryland, Oct. 17–20, 1994 SAE Technical Paper Series pp. 1–44 (942057).

"Indirect Adaptive Control of a Three–Way Catalyst," Esfandiar Shafai, et al. Swiss Federal Institute of Technology Society of Automotive Engineers, Inc., Copyright 1996 pp. 185–193 (961038).

"Detection of Catalyst Perfomance Loss Using On–Board Diagnostics," Clemmens et al., U.S. Environmental Protection Agency; SAE Congress, Detroit, 1990. pp. 1–18.

"Model–Based Fuel Injection Control System for SI Engines," Masahiro Nasu et al. Toyota Motor Corp.; International Spring Fueld & Lubricants Meeting, Dearborn, MI May 6–8, 1996; SAE Technical Paper Series pp. 85–95.

"Model Based Air Fuel Ratio Control for Reducing Exhaust Gas Emissions," Akira Ohata, et al., Toyota Motor Corp.; International Congress and Exhibition, Detroit, MI, Feb. 27–Mar. 2, 1995; SAE Technical Paper Series pp. 115–122.

*Primary Examiner*—Thomas E. Denion
*Attorney, Agent, or Firm*—Jasper W. Dockrey

[57] ABSTRACT

The catalyst control method of the invention continuously estimates a level of oxygen stored by a catalyst within a catalytic converter. The estimated oxygen stored by the catalyst is compared to a predetermined threshold and positive or negative deviations in the oxygen amount from the threshold is determined. When a positive deviation from the threshold amount is detected, the air/fuel ratio flowing into an engine (16) is decreased. Correspondingly, when a negative deviation is detected, the air/fuel ratio flowing into the engine (16) is increased. The amount of oxygen stored by the catalyst is determined by analyzing signals from a first gas sensor (28) positioned upstream from a catalytic converter (34) and a second gas sensor (30) positioned downstream from the catalytic converter (34). An engine control unit (10) integrates an expression for the mass flow rate of excess oxygen into the catalytic converter (34). Engine control unit (10) applies a change in air/fuel ratio to maintain the oxygen level on the catalyst within the catalytic converter (34) at a desired level.

14 Claims, 8 Drawing Sheets

METHOD FOR CONTROLLING THE LEVEL OF OXYGEN STORED BY A CATALYST WITHIN A CATALYTIC CONVERTER

CROSS-REFERENCE TO RELATED APPLICATIONS

Related subject matter is disclosed in a co-pending, commonly assigned patent application having attorney docket number AP01631 and filed on even date herewith.

1. Field of the Invention

This invention relates, in general, to engine exhaust gas control systems and methods of operation, and more particularly, to control systems and methods for controlling the oxygen storage level in a catalytic converter coupled to an engine.

2. Background of the Invention

Many environmental pollution laws currently in effect in the United States, and many foreign countries, require that exhaust emissions be reduced to levels previously thought unobtainable by the automotive industry. A key element of exhaust gas emission reduction systems is the catalytic converter, which in current automotive applications is used to simultaneously reduce the levels of carbon monoxide, oxides of nitrogen, and unburned hydrocarbons in the exhaust. Catalytic converters, however, are extremely expensive, as their pollutant reducing capabilities depend on the presence of one or more precious metals in the catalyst formulation (e.g. palladium).

Automotive exhaust gas catalysts have the ability to store (adsorb) and release (desorb) oxygen, carbon monoxide, and hydrocarbon molecules. This storage capability allows the catalyst to absorb short, rapid deviations to rich or lean air/fuel mixtures without loss of conversion efficiency. However, the catalyst has a finite storage capacity for oxygen and exceeding the oxygen saturation level of the catalyst rapidly degrades the catalyst's ability to reduce, for example, various nitrogen oxides. Similarly, the catalyst uses stored oxygen to oxidize carbon monoxide and hydrocarbons, when the air/fuel mixture is temporarily rich. Depleting the catalyst of its stored oxygen rapidly reduces the catalyst's ability to, for example, convert carbon monoxide into carbon dioxide.

In order to maintain catalytic converter performance during normal operation, exhaust gas sensors are used to maintain a stoichiometric air/fuel mixture in the exhaust stream. Most fuel systems presently in use employ a heated-exhaust-gas-oxygen (HEGO) sensor in front of the catalyst. The HEGO sensor provides a high voltage if the exhaust gas is rich of stoichiometry, and a low voltage if the exhaust gas is lean of stoichiometry. This switching behavior of the HEGO sensor results in a feedback control system characterized by a limit cycle about stoichiometry (often referred to as the 'ramp-up jump-down' characteristic). In other applications, an additional HEGO sensor aft of the catalyst is used to provide information that is used to adjust for the effects of aging in the forward sensor. In still other applications, an upstream Universal Exhaust Gas Oxygen (UEGO) sensor is coupled with a downstream HEGO sensor to control the air/fuel ratio to stoichiometry. The UEGO sensor provides an actual measurement of the exhaust air/fuel ratio, but has not yet achieved wide-spread acceptance because it is slightly more expensive than the HEGO sensor.

The switching ratio of the upstream and downstream HEGO sensors can be used as an estimate of the oxygen storage capacity or activity of the catalyst (see, for example, "Detection of Catalyst Performance Loss Using On-Board Diagnostics," W. Clemmens et al., Society of Automotive Engineers, Detroit Michigan, 1990, paper 900062.). Although HEGO sensors are reliable and can function in the high-temperature, corrosive environment of an exhaust gas system, the switch ratio technique for catalyst monitoring has poor resolution and only provides an ability to determine gross changes in the catalyst conversion efficiency. Additionally, the switch ratio technique requires recalibration when there are system changes in the engine or the catalyst.

In many systems, HEGO sensors are used to maintain a stoichiometric air fuel ratio in the exhaust gas, and are also used to return the exhaust gas to a stoichiometric air/fuel ratio immediately following transient air/fuel errors. This technique, however, does not provide for control of the catalyst performance. For the purpose of the present description, a lean transient is characterized by an excess of oxygen relative to the amount of fuel inducted into an engine cylinder, and a rich transient is characterized by an excess of fuel inducted into the engine cylinder relative to the air charge in the cylinder. Several lean transients in succession can saturate the catalyst with oxygen, resulting in decreased converter efficiencies, even though stoichiometric exhaust gas is being put into the catalyst. Correspondingly, several rich transients in succession can deplete the catalyst of stored oxygen. Furthermore, once the catalyst is saturated with oxygen, a further air/fuel ratio excursion will pass unreacted exhaust gases directly through the catalyst, resulting in increased emissions levels.

Therefore, a method is needed for maintaining the catalyst performance at a level where the catalytic converter operates at near maximum conversion efficiency in both steady-state and transient operating conditions. This will permit the catalyst to operate at near maximum efficiency much more often than systems of the prior art. Accordingly, an improved catalyst control system is described which utilizes an upstream UEGO sensor and a downstream HEGO sensor in order to control the catalyst oxygen storage level.

DETAILED DESCRIPTION OF PREFERRED EMBODIMENTS

In order to maintain peak conversion efficiencies, the catalyst oxygen storage level should be maintained at roughly 50% of overall capacity. This ensures that there are sufficient precious metal sites available to reduce NOx and that sufficient oxygen is available to oxidize hydrocarbons and CO. If the catalyst is filled to its oxygen storage capacity, NOx efficiency will suffer, and if a lean transient occurs, NOx efficiency will plummet to unacceptable levels which may cause the vehicle to violate emissions regulations. Similarly, if the catalyst is entirely depleted of oxygen, hydrocarbon and CO conversion efficiencies will deteriorate, and if a rich transient occurs, hydrocarbon and CO efficiency will plummet to unacceptable levels likely to cause the vehicle to violate emissions regulations.

The present invention is a method for controlling the catalyst oxygen storage level of a catalytic converter, in which the amount of oxygen that can be stored by the catalyst within the catalytic converter is calculated based on information received from upstream and downstream exhaust gas sensors, as well as the mass flow rate of air into the engine. The catalyst oxygen storage level of the catalyst is determined by modeling the storage rate and release rate of oxygen in the catalyst. Mathematical expressions are developed based upon the catalyst oxygen storage level, the signals from the upstream and downstream exhaust gas sensors, and the mass flow rate of excess oxygen into the engine. The mathematical expression for the mass flow rate of excess oxygen is integrated to determine the amount of oxygen stored by the catalyst.

In the catalyst model, the catalyst is assumed to be a perfect oxygen storage device unless unreduced oxygen (a lean breakthrough) or unoxidized rich gases (rich breakthrough) are detected, or the integrated catalyst oxygen storage level falls or rises above the level at which a breakthrough was last detected. A rich or lean breakthrough is detected by a comparison of the present state of the downstream exhaust gas sensor with the state of the downstream exhaust gas sensor at a previous point in time. The method of the invention computes both the amount of oxygen absorbed onto the catalyst and the amount of oxygen released by the catalyst. The oxygen storage and release computations can be translated into the oxygen storage capacity (OSC) and the oxygen storage level of the catalyst. The amount of oxygen adsorbed by and desorbed from the catalyst can be advantageously employed in a variety of control systems for controlling the catalyst oxygen storage level, and for providing an operator with real-time performance indicators of the catalytic converter.

Figure 1:
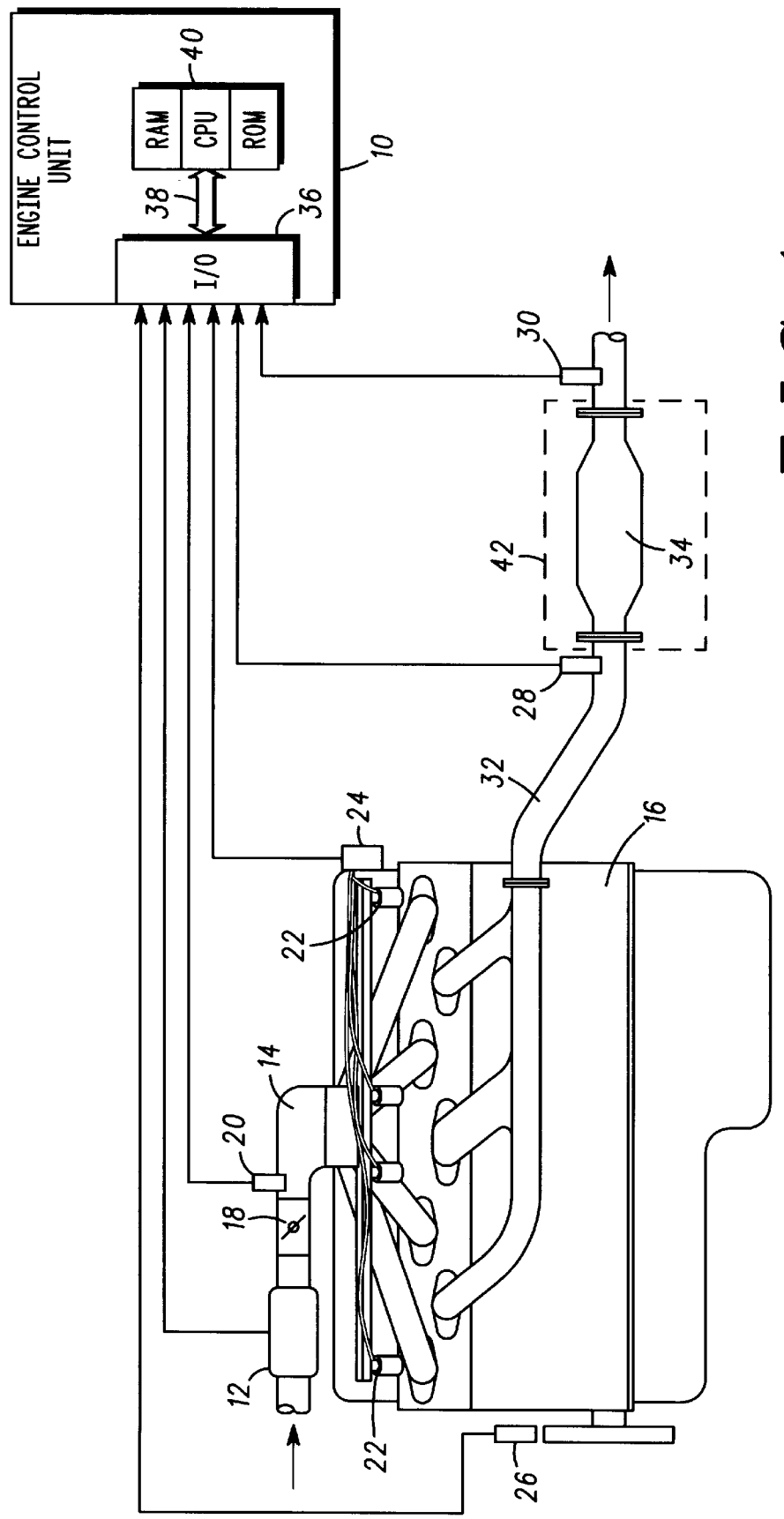
FIG. 1 is a schematic diagram of a catalyst control system arranged in accordance with the invention.

Shown in FIG. 1 is a schematic diagram of a catalyst control system arranged in accordance with the invention. An engine control unit 10 receives air flow rate information from a mass air flow (MAF) sensor 12 (or, alternatively, an absolute pressure sensor 20) positioned upstream of an intake manifold 14 coupled to an engine 16. A throttle 18 is also mounted upstream of intake manifold 14. Air entering intake manifold 14 flows to engine 16 past fuel injectors 22. An injector driver 24 is electrically coupled to engine control unit 10. Crank shaft position and engine speed information are relayed to engine control unit 10 by an engine sensor 26. An upstream exhaust gas sensor 28 and a downstream exhaust gas sensor 30 are mounted within an exhaust system 32. Exhaust gas system 32 includes a catalytic converter 34 positioned intermediate to upstream and downstream gas sensors 28 and 30, respectively.

Engine control unit 10 receives and transmits electrical signals through an I/O port 36. I/O port 36 is electrically coupled to control circuitry and storage registers by a data bus 38. All data storage, signal modulation, and computational procedures performed by the present invention are carried out by engine control unit 10 utilizing conventional circuit elements, such as a central processing unit, random access memory registers, read only memory registers, and the like. These elements are generally depicted as element 40 within engine control unit 10.

The computational approach for the catalyst control method of the invention defines a control volume 42 around the catalyst and monitors the flow of exhaust gases into and out of catalytic converter 34. An estimate of the mass flow rate of oxygen into the control volume 42 can be determined from measurements of the air mass flow rate and the excess air ratio according to equation (1), $$*m_{o_2 inlet} = C(*m_{air})[(\lambda_{inlet}-1)/\lambda_{inlet}] \quad (1)$$

where $*m_{o_2 inlet}$ is the mass flow rate of excess oxygen, $*m_{air}$ is the air mass flow rate, $\lambda_{inlet}$ is the normalized exhaust air/fuel mass ratio, and C is a constant representing the approximate mass fraction of oxygen in air (C=0.23). The excess air ratio $\lambda$ is the ratio of the actual air/fuel ratio to the stoichiometric air/fuel ratio, $\lambda = [A/F_{actual}/A/F_s]$, where $A/F_{actual}$ is the air/fuel mass ratio in the feed gas from the engine into the exhaust gas stream and $A/F_s$ is the stoichiometric mass ratio of air to fuel. Equation (1) can be simplified by converting $\lambda$ to the fuel/air equivalence ratio $\Phi$ according to equation (2)

$$\Phi = 1/\lambda. \quad (2)$$

Upon substituting equation (2) into equation (1) and rearranging, a simplified, general expression for the excess oxygen mass flow rate $*m_{o_2}$ can be expressed as equation (3), $$*m_{o_2} = C(*m_{air})(1-\Phi_{inlet}) \quad (3)$$

where $\Phi_{inlet}$ is the fuel/air equivalence ratio of exhaust gases upstream from the catalytic converter.

If it is assumed that the catalyst is a near-perfect oxygen storage device, the oxygen storage level can be obtained by integrating the flow rate of oxygen into the catalyst over time. To determine the oxygen storage level in the catalyst at any time t, $\overline{m}_{o_2}(t)$, equation (3) can be integrated over a time interval as expressed by equation (4), $$\overline{m}_{o_2}(t) = C \int_a^t [*\dot{m}_{air}(\tau)][1-\Phi_{inlet}(\tau)]d\tau \quad (4)$$

where "a" and "t" are limits of integration and $\tau$ is a time integration variable.

The total amount of available oxygen storage capacity (OSC) for a particular catalyst can be measured by integrating the flow rate of oxygen into the catalyst from a depleted point to a point in time where the catalyst is saturated with oxygen, as shown by equation (5)

$$OSC = C \int_a^b [\dot{m}_{air}(\tau)][1-\Phi(\tau)]d\tau \quad (5)$$

where integration limits "a" and "b" specify points in time related to complete depletion of oxygen from the surface of the catalyst and to complete saturation of the catalyst surface with oxygen. The lower integration limit "a" corresponds to a point in time where a transition from a rich feed gas to a lean feed gas is detected by upstream gas sensor 28 after a sufficiently rich gas flow to deplete the catalyst surface of oxygen. The upper integration limit "b" corresponds to a point in time where the catalyst is saturated with oxygen. This point is detected when the signal from downstream gas sensor 30 crosses a threshold value.

For purposes of definition, as used herein, a value of $\lambda$ less than one indicates a rich condition, in which the exhaust gas contains a high fuel concentration. Correspondingly, for values of $\lambda$ greater than one, a lean condition occurs indicating the exhaust gas contains a low fuel concentration and a high oxygen concentration. Furthermore, the present invention will be described in terms of a breakthrough event. A lean breakthrough is defined as a change in the $\lambda$ value of downstream gas sensor 30 from a rich condition to a lean condition. Alternatively, a rich breakthrough occurs where downstream gas sensor 30 switches from a lean condition to a rich condition.

Those skilled in the art will appreciate that the computation of $\lambda$ can be carried out by engine control unit 10 upon receiving input from various kinds of exhaust gas sensors. For example, a universal exhaust gas oxygen (UEGO) sensor can be used in which a proportional voltage signal is output depending upon the oxygen concentration in the sensed exhaust gas stream. Alternatively, a heated exhaust gas oxygen (HEGO) sensor or an exhaust gas oxygen (EGO) sensor can be used in the downstream position. In the case of a HEGO or EGO sensor, a rich breakthrough may be inferred on a change in the state of the signal from lean to rich, and a lean breakthrough may be inferred on a change in the state of the signal from rich to lean.

It is important to note that if a downstream UEGO is available, then the catalyst oxygen storage level and capacity are easily obtained. From the principle of conservation of mass, the amount of oxygen storage in the control volume is equal to the difference between the inlet flow and the outlet flow (assuming that the data is time aligned to offset time delays in the system). However, due to the higher cost of a UEGO sensor relative to the cost of a HEGO sensor, the preferred embodiment of this invention employs an upstream (relative to the catalyst) UEGO and a downstream (relative to the catalyst) HEGO. Therefore, it is necessary to estimate the amount of oxygen stored in the catalyst based on an MAF sensor signal, a UEGO sensor signal, and a HEGO sensor signal.

Referring again to equation (4), mass air flow rate $*m_{air}$ is provided by MAF sensor 12, which in a preferred embodiment is a hot wire mass air flow rate sensor. For non-steady state conditions, it is common practice to compute the air flow rate into the engine by determining the manifold pressurization or depressurization using a manifold mathematical model. This determination is then factored into the air flow rate measured by MAF sensor 12. A value for $\Phi$ is calculated by engine control unit 10 from the output of upstream gas sensor 28.

Those skilled in the art will recognize that many numerical techniques exist for computing values of finite integrals, such as the integral of equation (4). In a preferred embodiment of the invention, a trapezoidal algorithm is used to compute the integral of equation (4), however another numerical integration technique, such as Newton's finite difference, and the like, can also be used. In the preferred embodiment of the invention, the computational method employs a trapezoidal algorithm in which the integral of equation (4) is expressed as equation (6), $$\overline{m}_{o_2}(k) = \overline{m}_{o_2}(k-1) + [*m_{o_2}(k) + *m_{o_2}(k-1)]T/2 \tag{6}$$

where k is an iteration counter, and T is the time period between values calculated at time (k−1) and time (k). In equation (4), "a" is analogous to (k−1) and "t" is analogous to time (k).

However, in certain situations equations (3) and (4) do not completely model the flow of oxygen into the catalyst. For example, if the catalyst is nearly filled with oxygen, then the oxygen storage rate falls off to zero as the catalyst oxygen storage level approaches the oxygen storage capacity of the catalyst. Similarly, if the catalyst is nearly empty, the oxygen release rate falls off to zero as the catalyst oxygen storage level approaches zero. The foregoing conditions need to be taken into account for the development of the high-precision control method of the present invention. To address these conditions, equations (3) and (4) can be modified to account for extreme oxygen loading and depravation.

The control method of the invention employs a rich rate modifier $\Gamma_{rich}$ and a lean rate modifier $\Gamma_{lean}$ to equations (4) and (6) to determined the oxygen storage level $\overline{m}_{o_2}$. When upstream gas sensor 28 detects a rich condition ($\lambda<1$), the rich rate modifier is applied as shown in equation (7)

$$m_{o_2} = C \int_a^b \Gamma_{rich}[\overset{*}{m}_{air}(\tau)][1 - \Phi_{inlet}(\tau)]d\tau, \tag{7}$$

conversely, when upstream gas stream sensor 28 indicates a lean condition ($\lambda>1$), the lean rate modifier $\Gamma_{lean}$ is applied as shown in equation (8):

$$m_{o_2} = C \int_a^b \Gamma_{lean}[\overset{*}{m}_{air}(\tau)][1 - \Phi_{inlet}(\tau)]d\tau. \tag{8}$$

The rate modifiers $\Gamma_{rich}$ and $\Gamma_{lean}$ are determined by the previously calculated oxygen storage level during iteration (k−1), the rich or lean state of downstream gas sensor 30, and two adaptation parameters, $\Psi_{rich}$ and $\Psi_{lean}$. The adaptation parameters represent the catalyst oxygen level at the instant a rich or lean transition is detected by downstream gas sensor 30. If the state of the downstream gas sensor 30 is rich ($\lambda<1$) and if $\overline{m}_{o_2}(k-1)$ is less than or equal to $\Psi_{rich}$, $\Gamma_{rich}(k)$ is obtained using equation (9), otherwise $\Gamma_{rich}(k)$ is set equal to 1.

$$\Gamma_{rich}(k) = \overline{m}_{o_2}(k-1)/\Psi_{rich}. \tag{9}$$

Similarly, if the state of the downstream gas sensor 30 is lean ($\lambda>1$) and $\overline{m}_{o_2}(k-1)$ is greater than or equal to $\Psi_{lean}$, $\Gamma_{lean}(k)$ is obtained from equation (10), otherwise, $\Gamma_{lean}(k)$ is set equal to 1.

$$\Gamma_{lean}(k) = 1 + K(\Psi_{lean} - \overline{m}_{o_2}(k-1)) \tag{10}$$

where K is the lean breakthrough decay rate constant (a calibratable parameter dependent on catalyst formulation and engine operating condition). The decay rate constant K is based on the Oxygen Storage Capacity of the catalyst OSC, and the initial lean breakthrough adaptation parameter $\Psi_{lean}$, as shown by equation (11).

$$K = 1/(OSC - \Psi_{lean}) \tag{11}$$

As used herein, OSC is the total oxygen storage capacity of the catalyst in a completely saturated condition. It is important to note that the rate modifiers $\Gamma_{rich}$ and $\Gamma_{lean}$ are normally equal to 1, implying that the catalyst is usually able to store and deplete oxygen at a rate equal to the oxygen flow rate into the catalyst. However, a state transition by downstream gas sensor 30 indicates that a breakthrough has occurred and the oxygen storage rate will subsequently decrease to zero.

Note that due to the binary nature of the HEGO, a rich breakthrough followed by a return to stoichiometry followed by a another rich breakthrough will appear extremely similar to a single long-duration rich breakthrough. A similar behavior can be seen on the lean side of stoichiometry. This is the reason that $\Gamma_{rich}$ and $\Gamma_{lean}$ are dependent on the previous value of the oxygen storage level $\bar{m}_{o_2}$ (k-1) and $\Psi_{rich}$ and $\Psi_{lean}$ respectively. Otherwise, extended operation on one side of stoichiometry would cause integral (7) or (8) to assume physically unrealistic values. With the rate modifier scheme as here described, the integrals (7) and (8) are self-limiting and no anti-windup scheme is required.

The adaptation parameters $\Psi_{lean}$ and $\Psi_{rich}$ represent the oxygen level in the catalyst at the instant a rich or lean transition is detected by downstream gas sensor 30. The adaptation parameter $\Psi_{lean}$ is determined according to equation (12)

$$\Psi_{lean}(n) = w\Psi_{lean}(n-1) + x\bar{m}_{o_2}(n) \qquad (12)$$

where (n) is a counter corresponding to the number of lean transitions detected by downstream gas sensor 30. The value of the adaptation parameter $\Psi_{lean}$ is heavily weighted by the value determined in the most recent prior state transition of downstream gas sensor 30.

The adaptation parameter $\Psi_{rich}$ is given by equation (13)

$$\Psi_{rich}(m) = y\Psi_{rich}(m-1) + z\bar{m}_{o_2}(m) \qquad (13)$$

where (m) is a counter corresponding to the number of rich transitions detected by downstream gas sensor 30. It should further be noted that the coefficients in equations (12) and (13) are arbitrary and may be chosen to have values ranging from 0 to 1. In one embodiment, w=0.9, x=0.1, y=0.5, and z=0.5. Using these values, in comparison to the adaptation parameter $\Psi_{lean}$, the value for $\Psi_{rich}$ is more heavily weighted toward the present oxygen storage level in the catalyst. In this case, since a rich transition does not necessarily correspond to a fixed catalyst oxygen storage level, $\Psi_{rich}$ is weighted much more heavily toward the oxygen storage level at the most recent rich transition of downstream gas sensor 30.

When a rich or lean transition occurs (as defined earlier), the value of the oxygen storage level integral (equations (7) and (8)) is reset to $\Psi_{lean}$ or $\Psi_{rich}$ ($\Psi_{lean}$ for a lean breakthrough and $\Psi_{rich}$ for a rich breakthrough). Resetting the integral solves the problem of not knowing the catalyst oxygen storage level when the exhaust gas sensors initially become active. By rearranging equation (11), the estimated oxygen storage capacity OSC of the catalyst can be recomputed as:

$$OSC = \Psi_{lean} + 1/K \qquad (14)$$

where $\Psi_{lean}$ is defined by equation (12). Note that a similar estimate of OSC may be obtained by using $\Psi_{rich}$ without departing from the fundamental teaching of this embodiment. Furthermore, this enables the control system to adapt to changing catalyst conditions as the catalyst ages and the catalyst's oxygen storage capacity deteriorates.

Those skilled in the art will recognize that alternative methods of estimating the catalyst oxygen storage level (such as a linear observer) may be utilized without departing from the fundamental teaching of this embodiment. For a linear observer, the estimated catalyst oxygen storage level is corrected with an additive term proportional to the error between the measured state variable value and an estimated state variable value, as shown in equation (15)

$$\bar{m}_{o_2}(k+1) = m_{o_2}(k) + K(\Psi_{lean} - \bar{m}_{o_2}(k)) \qquad (15)$$

Once the catalyst oxygen storage level $\bar{m}_{o_2}$ has been estimated, a simple control law having the form shown in equation (16) can be used, $$\delta\lambda = K_p(\bar{m}_{o_2} - m_{o_2des}) \qquad (16)$$

where $K_p$ is a proportional gain term, and $m_{o_2des}$ is the desired oxygen storage level in the catalyst. The offset term ($\delta\lambda$) is then added to the set point used by the normal feedback set point controller. It is important to note that other control laws (such as a Proportional Integral Derivative or a Linear Quadratic Regulator) could be used without departing from the fundamental teaching of this embodiment.

Figure 2:
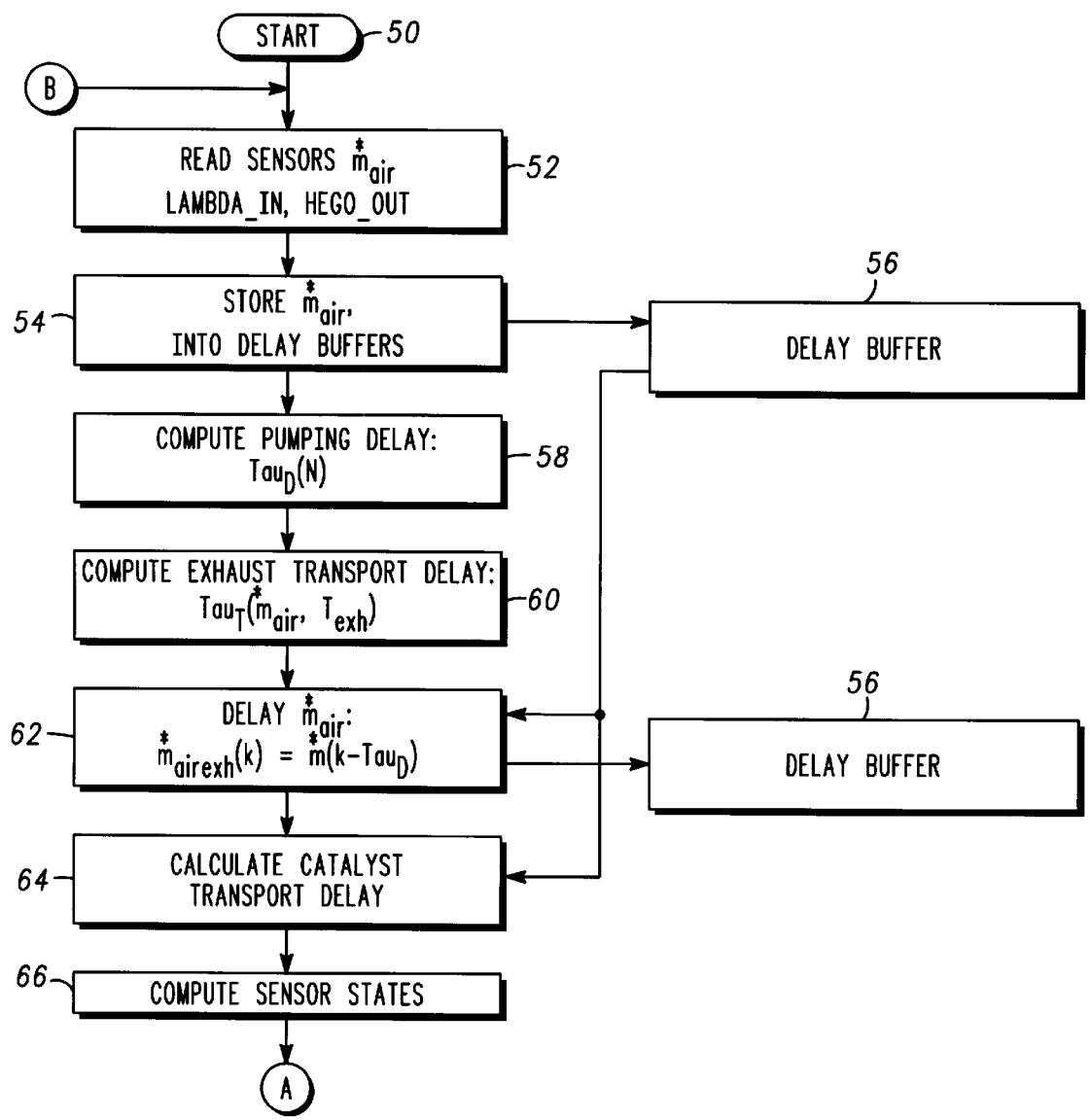
FIGS. 2 and 3 illustrate a flow diagram for sensor signal processing in accordance with the invention.
Figure 3:
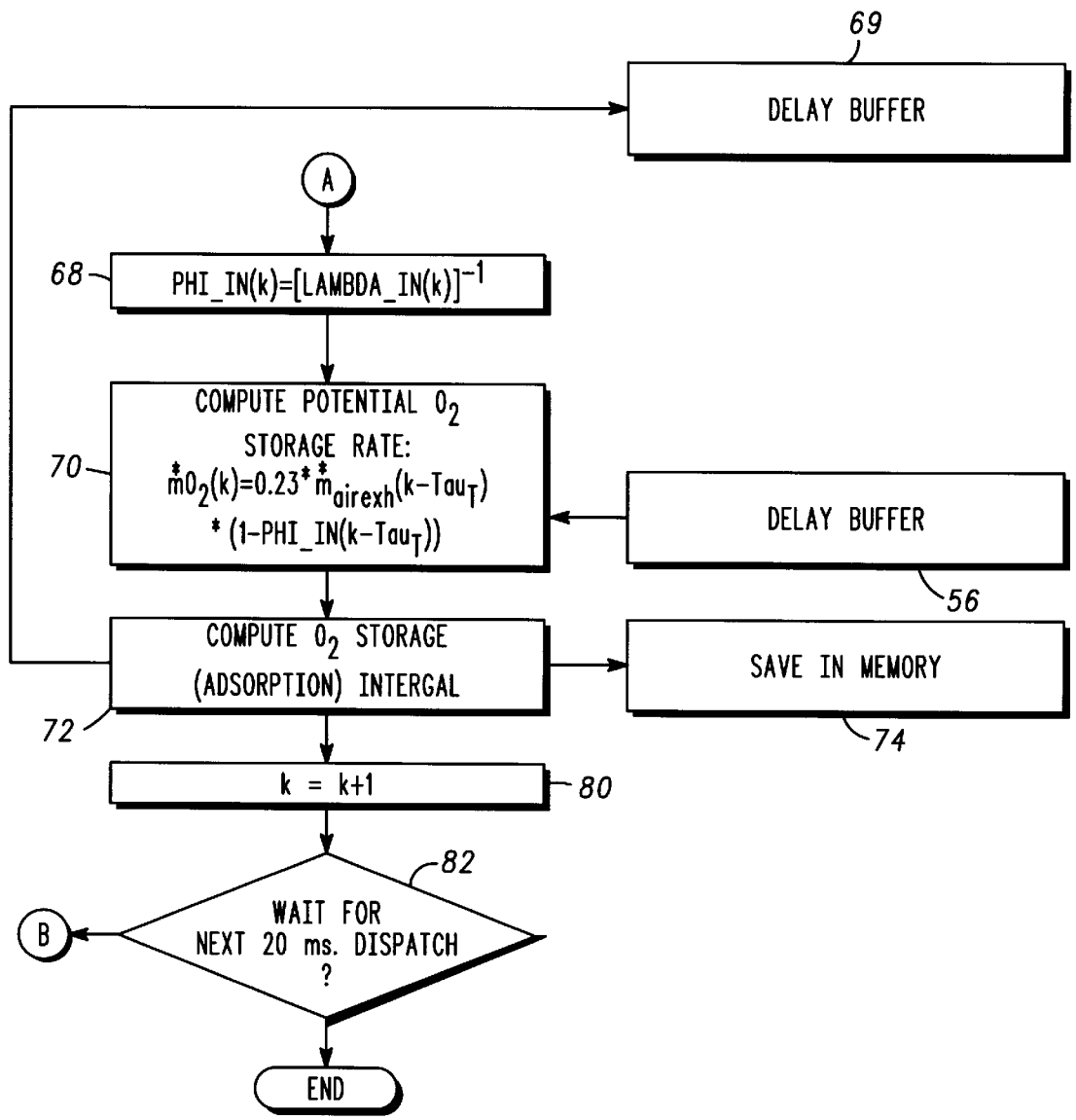

The method of the invention will now be described with reference to FIGS. 2–9. FIGS. 2–5 illustrate a flow diagram of a computational algorithm carried out in accordance with one embodiment of the invention. The Main Program routine for computation and retention of information concerning the oxygen storage level is shown in FIGS. 2 and 3. Counters k, m and n are initialized at step 50. At step 52, a sensor reading for mass air flow from MAF sensor 12 is obtained, a λ value is read from upstream sensor 28, and a reading as to whether the post catalyst exhaust gas is rich or lean is obtained from downstream sensor 30. At step 54, a value for *$m_{air}$ is stored in buffers 56.

Those skilled in the art will appreciate that computation of gas hold-up delays in engine 16 and exhaust system 32 are necessary for an accurate determination of exhaust gas residence time in catalytic converter 34. Accordingly, pumping delay time $\tau_d$ and exhaust system transport delays $\tau_t$ are computed at step 58 and step 60, respectively. The delayed value for *$m_{air}$ is computed at step 62 and stored in delay buffer 56. The catalyst transport delay is computed at step 64. The switching state of downstream gas sensor 30 is determined at step 66 using a flow diagram for computation of gas sensor states shown in FIG. 4.

Referring to FIG. 3, the main computational routine continues with the computation of the value for $\Phi_{inlet}$ at step 68. At step 70, information from delay buffer 56 is read and a value for the oxygen mass flow for the current iteration is computed. Once a value for the oxygen mass flow rate is available, the oxygen storage level in the catalyst is computed at step 72 using a flow diagram for computation of oxygen storage by a catalyst shown in FIG. 5. The computed value returned by the subprogram for the oxygen storage level of the catalyst is placed in memory register 74, an delay buffer 69. Next, time counter k is advanced by one at step 80 and program control transfers to step 82 and awaits prompting by the CPU to return program control to step 52, where another computational sequence begins.

Figure 4:
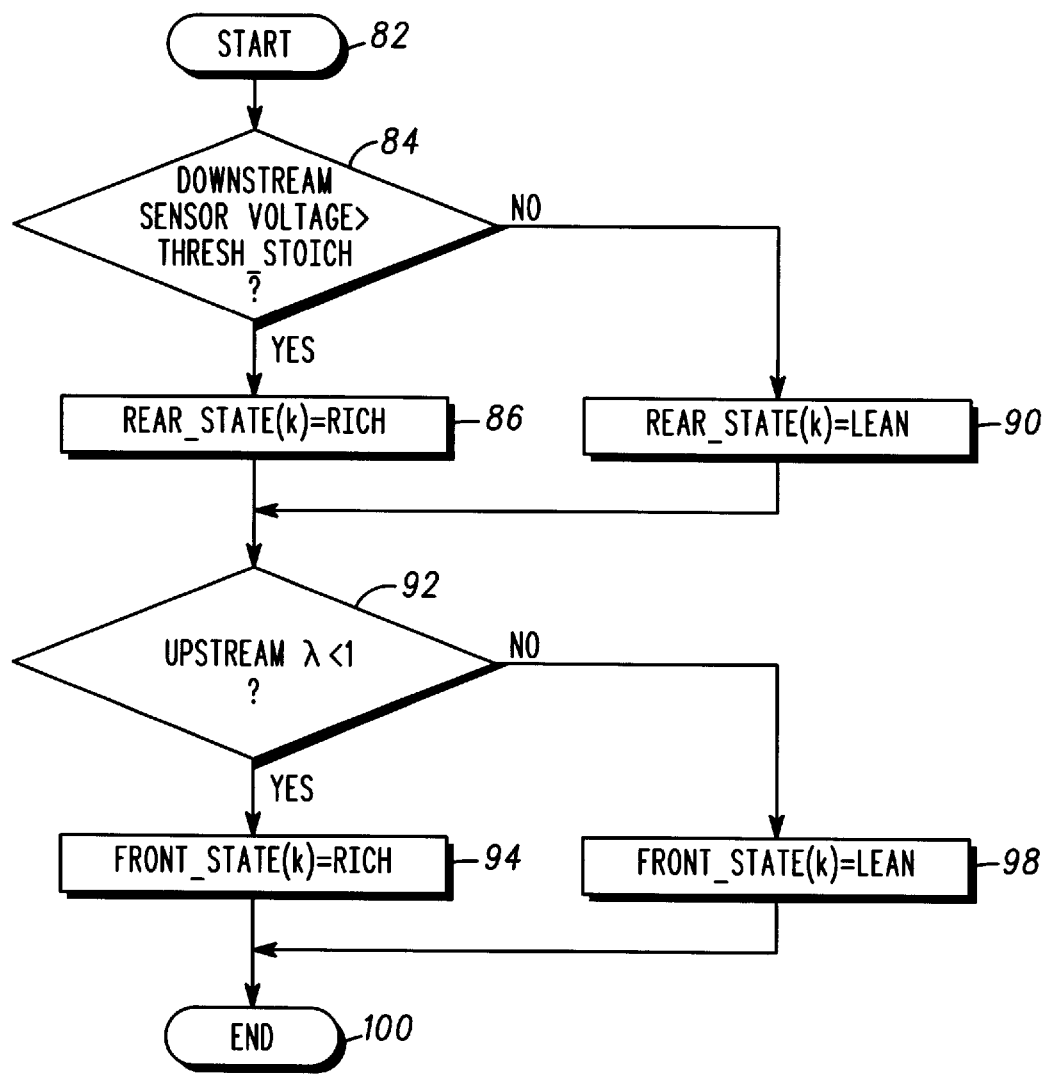
FIG. 4 illustrates a flow diagram for computation of gas sensor states in accordance with the invention.

Referring to the flow diagram shown in FIG. 4, upon receiving program control from step 66, the voltage from downstream sensor 30 is compared with a threshold value at step 84. If the voltage is greater than the threshold, then the state of the downstream sensor is set to rich at step 86, otherwise the state of the downstream sensor 30 is set to lean at step 90.

Once the state of downstream gas sensor 30 (shown in FIG. 1) is specified, the λ value of upstream gas sensor 28 (shown in FIG. 1) is compared with stoichiometry (λ=1) at step 92. If the λ value of upstream gas sensor 28 is less than one, the state of upstream gas sensor 28 is set to rich at step 94. Alternatively, if the λ value of upstream gas sensor 28 is not less than one, then upstream gas sensor 28 is set to lean at step 98. Program control then transfers back to step 66 in the Main Program. Those of ordinary skill in the art will recognize that there are several alternative schemes for determining the state of the exhaust gas sensors, which do not depart from the fundamental teaching of this embodiment. For example, the lean and rich computations can be performed in an order opposite of that shown here.

Figure 5:
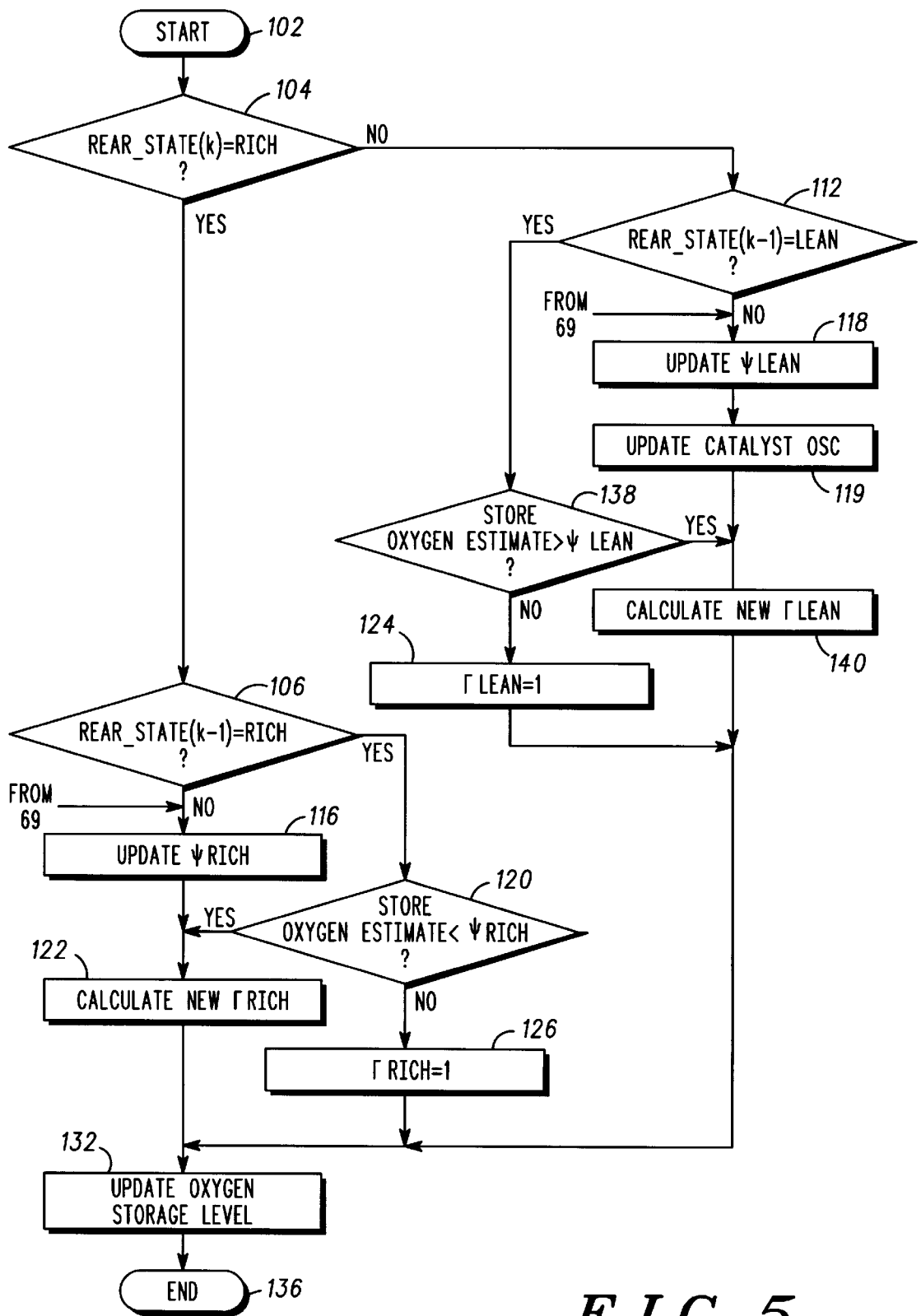
FIGS. 5 illustrates a flow diagram for computation of oxygen storage by a catalyst in accordance with the invention.

The flow diagram for computation of oxygen storage by a catalyst is illustrated in FIG. 5. The subprogram begins at a start step 102. The state of downstream gas sensor 30 for the present iteration (k) is examined at step 104. If the present state of the sensor is rich, program control transfers to step 106. If the status of downstream sensor 30 at the present iteration (k) is not rich, programming control is transferred to step 112. In step 106, the state of the downstream gas sensor 30 for the previous iteration (k−1) is examined. If the previous state of the downstream exhaust gas sensor is not rich, program control is transferred to step 116, where a new value for $\Psi_{rich}$ is calculated according to equation (13). Step 122 is then executed, during which a new value for $\Gamma_{rich}$ is calculated according to equation (9). Once a value for $\Gamma_{rich}$ has been calculated during step 122, the value of the catalyst oxygen storage level is updated in step 132 according to equations (6) and (7). During step 106, if the previous state of the downstream exhaust gas sensor is rich, program control is transferred to step 120, where the value of the estimate of the catalyst oxygen storage level is compared to $\Psi_{rich}$. If the value of the estimate of the catalyst oxygen storage level is less than $\Psi_{rich}$, then program control is transferred to step 122, where a new value for $\Gamma_{rich}$ is calculated according to equation (9). Once a value for $\Gamma_{rich}$ has been calculated during step 122, the value of the catalyst oxygen storage level is updated in step 132 according to equations (6) and (7). If the value of the estimate of the catalyst oxygen storage level is found to be greater than or equal to $\Psi_{rich}$ during the execution of program step 120, control is transferred to step 126, where $\Gamma_{rich}$ is set equal to one. Once a value for $\Gamma_{rich}$ has been calculated during step 126, the value of the catalyst oxygen storage level is updated in step 132 according to equations (6) and (7).

If the state of downstream gas sensor 30 is not equal to rich in the present iteration (k), then programming control is transferred to step 112. In step 112, the state of the downstream gas sensor 30 for the previous iteration (k−1) is examined. If the previous state of the downstream exhaust gas sensor is not lean, program control is transferred to step 118, where a new value for $\Psi_{lean}$ is calculated according to equation (12). Step 119 is then executed, during which a new value for the catalyst Oxygen Storage Capacity (OSC) is calculated according to equation (14). Step 140 is then executed, during which a new value for $\Gamma_{lean}$ is calculated according to equations (10) and (11). Once a value for $\Gamma_{lean}$ has been calculated during step 140, the value of the catalyst oxygen storage level is updated in step 132 according to equations (6) and (8).

During step 112, if the previous state of the downstream exhaust gas sensor is lean, program control is transferred to step 138, where the value of the estimate of the catalyst oxygen storage level is compared to $\Psi_{lean}$. If the value of the estimate of the catalyst oxygen storage level is greater than $\Psi_{lean}$, then program control is transferred to step 140, where a new value for $\Gamma_{lean}$ is calculated according to equations (10) and (12). Once a value for $\Gamma_{lean}$ has been calculated during step 140, the value of the catalyst oxygen storage level is updated in step 132 according to equations (6) and (8). If the value of the estimate of the catalyst oxygen storage level is found to be less than or equal to $\Psi_{lean}$ during the execution of program step 138, control is transferred to step 124, where $\Gamma_{lean}$ is set equal to one. Once a value for $\Gamma_{lean}$ has been calculated during step 124, the value of the catalyst oxygen storage level is updated in step 132 according to equations (6) and (8).

Those skilled in the art will recognize that the computational procedure described above can also be carried out using the mass flow rate of fuel into the engine, rather than the mass flow rate of air. The mass flow rate of oxygen in the exhaust can be determined according to equation (17), $$*m_{o_2} = C(*m_{fuel})(\lambda_{inlet} - 1) \qquad (17)$$

where $*m_{fuel}$ is the mass flow rate of fuel into engine 16 through injectors 22.

The mass flow rate of fuel, in grams per second, for a single injector per cylinder, sequentially-fueled engine can be determined from the injector pulse width as shown by equation (18), $$*m_{fuel} = \text{(injector pulse width)(injector flow specification)(number of cylinders)(RPM/2)(1/60)} \qquad (18)$$

where RPM is the rotational speed in revolutions per minute of engine 16 as determined by engine sensor 26. Those skilled in the art will recognize that equation (17) can be a direct substitute for equation (1) and can be integrated to give the storage capacity of oxygen in catalytic converter 34. This computation can be performed in a manner analogous to that described by equations (4), (7), and (8) using the mass air flow.

Figure 6:
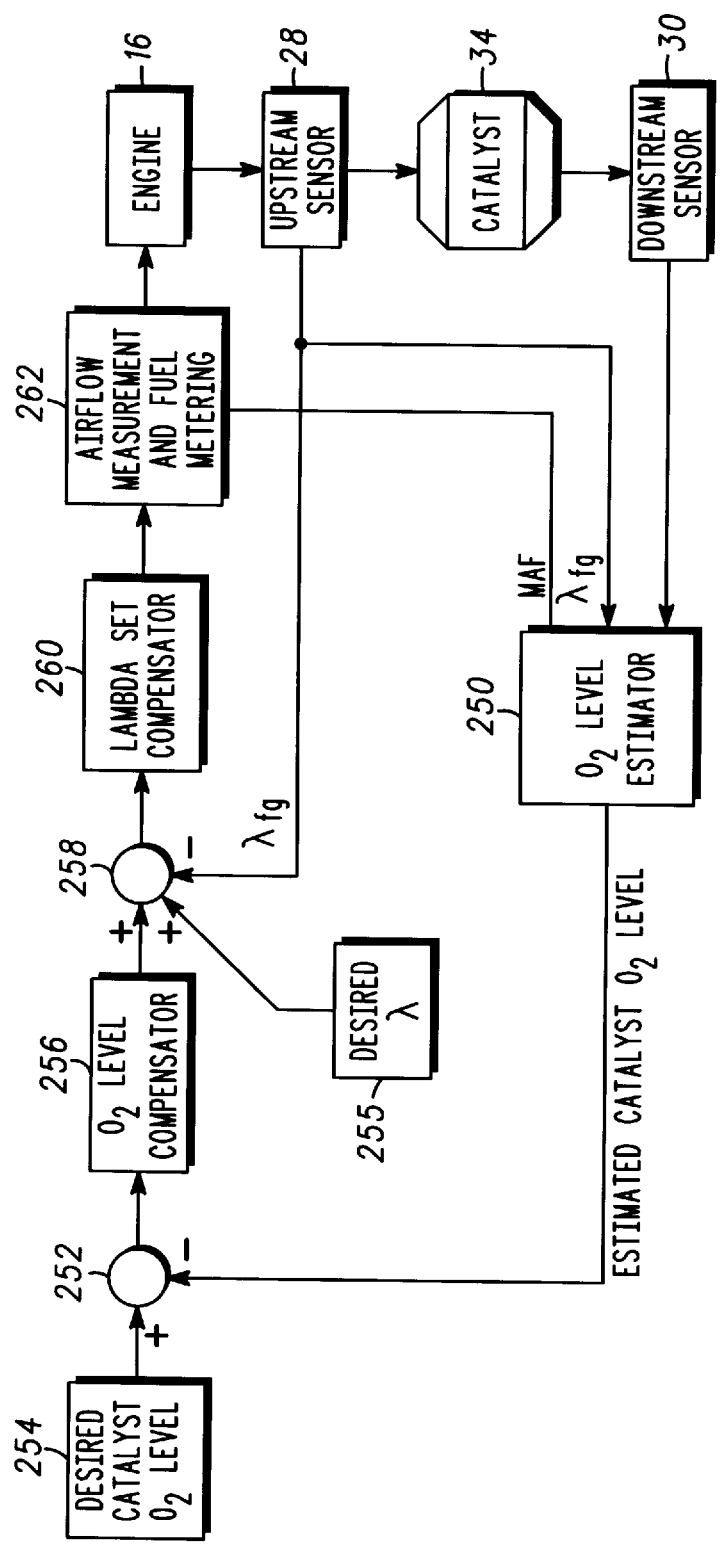
FIG. 6 is a signal processing schematic diagram in accordance with an exemplary embodiment of the invention for control of catalyst oxygen storage level.
Figure 7:
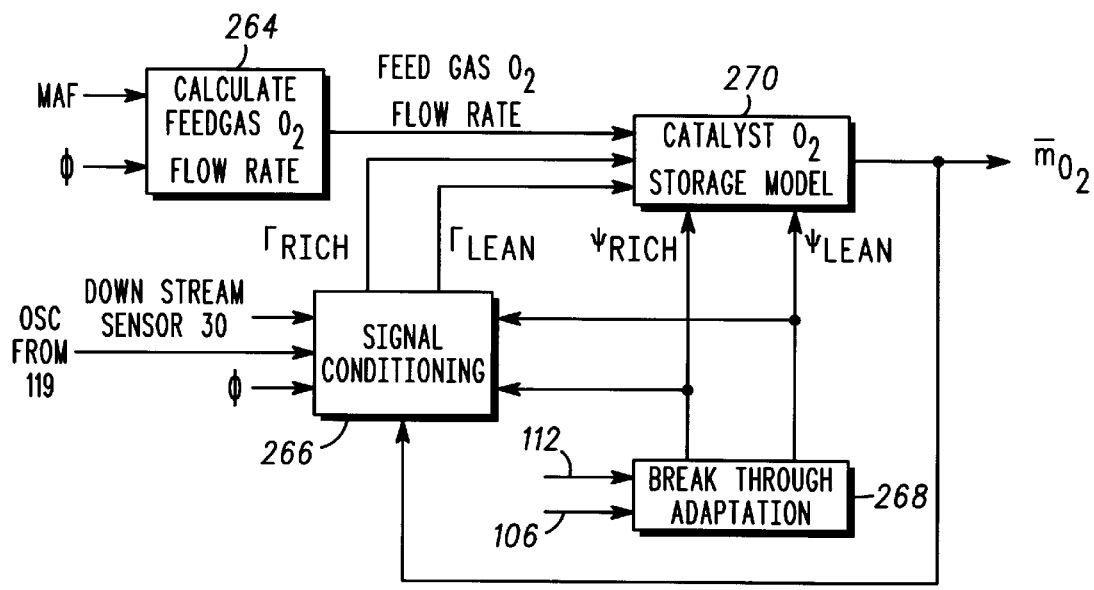
FIG. 7 is a signal processing schematic diagram in accordance with an exemplary embodiment of the invention for estimation of catalyst oxygen storage level.
Figure 8:
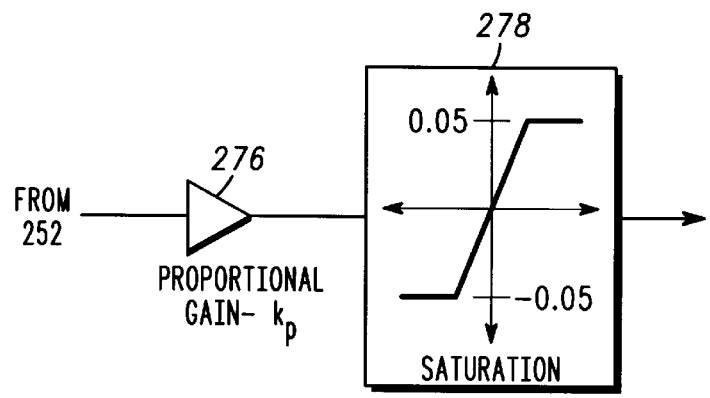
FIG. 8 is a signal processing schematic diagram in accordance with an exemplary embodiment of the invention for implementation of the catalyst oxygen storage level control law.

Those skilled in the art will recognize that the foregoing method can be implemented in a variety of circuit arrangements for processing information obtained by the various sensor outputs. FIGS. 6–8 illustrate one embodiment of a signal processing arrangement for controlling the oxygen storage level of a catalytic converter in accordance with the invention. The signal processing arrangement can be carried out, for example, in engine control unit 10 (shown in FIG. 1).

The method for estimating the catalyst oxygen storage level of catalytic converter 34 can be employed in a method to control the amount of oxygen stored by the catalyst. In order to provide a buffer against transient deviations within catalytic converter 34, the control method of the invention estimates the oxygen being stored in the catalyst during a transient lean excursion, or the depletion of oxygen from a catalyst during a rich excursion. The control method then acts to restore the catalyst to a desired level of oxygen storage by offsetting the effect of an excursion. The excess oxygen flow entering engine 16 can be adjusted by engine control unit 10 in response to a rich or lean transient detected by upstream gas sensor 28 and downstream gas sensor 30.

Ideally, rich and lean transient deviations within catalytic converter 34 can best be compensated for by maintaining the oxygen concentration on the catalyst at approximately one-half of the catalyst maximum oxygen storage capacity. By actively regulating the amount of oxygen stored by the catalyst, a buffer is maintained to absorb transient deviations and maintain the catalyst conversion efficiency. For example, following a rich deviation, engine control unit 10 adjusts the excess air ratio flowing into engine 16 to restore the oxygen stored by the catalyst to 50% of capacity. The catalyst is then prepared to absorb a subsequent rich deviation, or a lean deviation. Without the corrective action, a subsequent rich deviation could cause an excessive breakthrough of unoxidized exhaust gases. Note that if desired, the catalyst oxygen storage level can be maintained at a level other than 50%.

One embodiment for controlling the amount of oxygen stored by the catalyst in catalytic converter 34 is illustrated in FIG. 6. The output from upstream and downstream gas sensors 28 and 30 (shown in FIG. 1) are continuously fed to an oxygen level estimator circuit 250. Oxygen level estimator circuit 250 outputs an estimate for the catalyst oxygen storage level to a difference circuit 252. A target value for the oxygen storage level of the catalyst is output by memory 254 to a difference circuit 252. Difference circuit 252 subtracts the oxygen level estimate received from oxygen level estimator circuit 250 from the targeted catalyst oxygen storage level and outputs the difference to an oxygen level compensator circuit 256. Oxygen level compensator circuit 256 outputs a condition signal to a difference circuit 258. A target value for the $\lambda_{desired}$ set point is output by memory 255 to difference circuit 258. Difference circuit 258 subtracts the output of upstream gas sensor 28 from the sum of the output of oxygen level compensator circuit 256 and the output of memory 255. A $\lambda$ compensator circuit 260 receives the output of difference circuit 258 and relays control signals to circuitry 262. Circuitry 262 within engine control unit 10 continuously monitors the output of all engine sensors, such as MAF sensor 12, throttle 18, absolute pressure sensor 20, and engine sensor 26 (shown in FIG. 1). Circuitry 262 analyzes the output of the sensors in comparison to the input from $\lambda$ compensator circuit 260, and adjusts the output of injector driver 24 in engine 16 to control the fuel flow into engine 16. Circuitry 262 passes the output of MAF sensor 12 to oxygen level estimator circuit 250.

The exhaust gas from engine (16) flows over upstream sensor 28, which outputs a value for $\lambda_{fg}$ in the exhaust gas. The output of upstream sensor 28 is then passed to oxygen level estimator circuit 250, and difference circuit 258. The exhaust gas from engine 16, after passing over upstream sensor 28, passes through catalyst 34. The output of catalyst 34 (catalyzed exhaust gas), then passes over downstream sensor 30. The output of downstream sensor 30 (which is the state of the catalyzed exhaust gas) is then passed to oxygen estimator circuit 250.

The method of operation of oxygen level estimator circuit 250 is illustrated in FIG. 7. Circuit 264 receives mass air flow information from delay buffer 56 and the fuel/air equivalence ratio $\Phi$ from engine control unit 10 and computes a value for the excess oxygen flow rate in accordance with equation (3). Circuit 264 then outputs the excess oxygen flow rate to a catalyst oxygen storage model circuit 270. A signal conditioning circuit 266 receives a voltage output from downstream gas sensor 30, an OSC estimate from step 119, and the fuel/air equivalence ratio $\Phi$, and calculates values for $\Gamma_{rich}$ and $\Gamma_{lean}$ according to equations (9), (10), and (11). Signal conditioning circuit 266 then outputs the values for $\Gamma_{rich}$ and $\Gamma_{lean}$ to catalyst oxygen storage model circuit 270. A breakthrough adaptation circuit 268 receives the output of steps 112 and 106 (shown in FIG. 5) and calculates values for $\Psi_{rich}$ and $\Psi_{lean}$ based on equations (12) and (13). Breakthrough adaptation circuit 268 then outputs the values for $\Psi_{rich}$ and $\Psi_{lean}$ to catalyst oxygen storage model circuit 270 and to signal conditioning circuit 266. A catalyst oxygen storage model circuit 270 receives the output of circuit 264, signal conditioning circuit 266, and breakthrough adaptation circuit 268. Catalyst oxygen storage model circuit 270 then performs numerical integration in accordance with equations (6), (7), and (8), and outputs an estimate of the catalyst oxygen storage level on the catalyst to difference circuit 252 (shown in FIG. 6).

A signal processing schematic diagram for the operation of compensator circuit 256 is shown in FIG. 8. Proportional gain circuit 276 applies a gain to the difference signal from difference circuit 252 and outputs a gain signal to a limiter circuit 278. Limiter circuit 278 specifies the maximum positive or negative amount by which the fuel/air equivalence ratio $\Phi$ is to be adjusted. The adjustment quantity is then output by limiter circuit 278 to difference circuit 258 (shown in FIG. 6). As previously described, difference circuit 258 then subtracts the present fuel/air equivalence ratio output by upstream gas sensor 28 from the sum of the desired lambda set point $\lambda_{desired}$ (output from memory 255), and the output of limiter circuit 278. After performing the computations, difference circuit 258 relays the difference signal to $\lambda$ compensator circuit 260.

Figure 9:
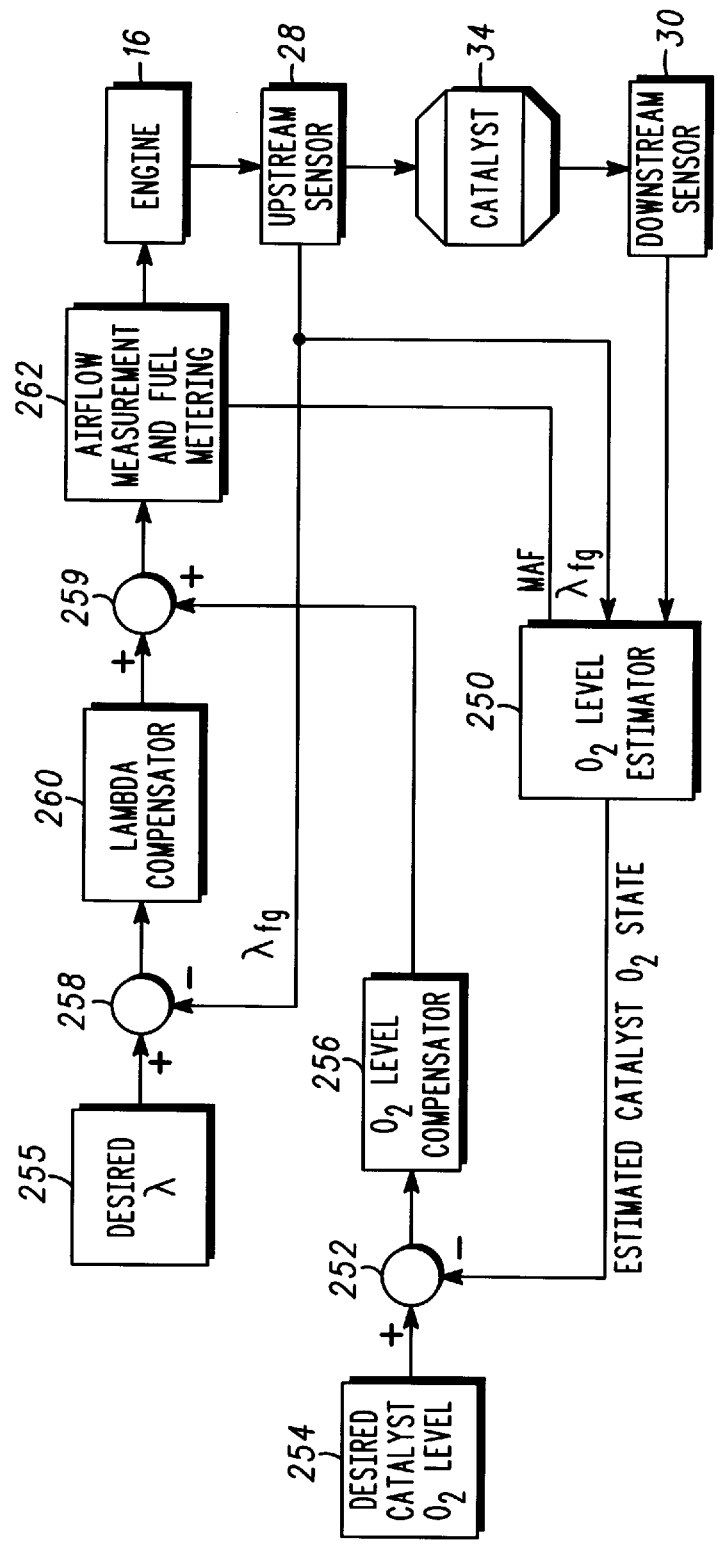
FIG. 9 is a signal processing schematic diagram in accordance with an alternative embodiment of the invention.

A signal processing schematic diagram showing an alternative embodiment for controlling the amount of oxygen stored by the catalyst in catalytic converter 34 is illustrated in FIG. 9. For ease of comparison, components having similar functions to those of the previous embodiment (FIGS. 6, 7, and 8) are identified by the same name and element numbers in the alternative embodiment. Referring to FIG. 9, the output from upstream and downstream gas sensors 28 and 30 are continuously fed to oxygen level estimator circuit 250. Oxygen level estimator circuit 250 outputs an estimate for the catalyst oxygen storage level presently stored by the catalyst to difference circuit 252. A target value for the catalyst oxygen storage level of the catalyst is output by memory 254 to difference circuit 252. Difference circuit 252 subtracts the oxygen level estimate received from oxygen level estimator circuit 250 from the targeted oxygen level and outputs the difference to oxygen level compensator circuit 256. Oxygen level compensator circuit 256 outputs a condition signal to a difference circuit 259. A target value for $\lambda_{desired}$ is output by memory 255 to difference circuit 258. Difference circuit 258 subtracts the output of upstream gas sensor 28 from the output of memory 255. Lambda compensator circuit 260 receives the output of difference circuit 258 and passes the output of $\lambda$ compensator circuit 260 to difference circuit 259. Difference circuit 259 sums the output of $\lambda$ compensator circuit 260 and oxygen level compensator circuit 256. Difference circuit 259 then relays its output to circuitry 262 located within engine control unit 10.

Circuitry 262 continuously monitors the output of all engine sensors, such as MAF sensor 12, throttle 18, absolute pressure sensor 20, and engine sensor 26. Circuitry 262 analyzes the output of the sensors in comparison to the input from difference circuit 259, and adjusts the output of injector driver 24 in engine 16 to control the fuel flow into engine 16. Circuitry 262 passes the output of MAF sensor 12 to oxygen level estimator circuit 250. The output of engine (16) (the exhaust gas) then flows over upstream sensor 28, which outputs a value for $\lambda_{fg}$ in the exhaust gas. The output of upstream sensor 28 is then passed to oxygen level estimator circuit 250, and difference circuit 258. The output of engine 16, after passing over upstream sensor 28, passes through catalyst 34. The output of catalyst 34 (catalyzed exhaust gas), then passes over downstream sensor 30. The output of downstream sensor 30 (the state of the catalyzed exhaust gas) is then passed to oxygen level estimator circuit 250.

Thus it is apparent that there has been provided, in accordance with the invention, a method for controlling the amount of oxygen stored by a catalyst within a catalytic converter, which fully meets the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. For example, different circuit arrangements can be provided to carry out the necessary computations. Additionally, other exhaust gas sensor could be employed without departing from the fundamental teaching of this embodiment. For example, two UEGOs or two HEGOs could be employed to control catalyst oxygen storage level. It is therefore intended to include within the invention all such variations and modifications as fall within the scope of the appended claims and equivalents thereof.

We claim:

1. A method for controlling the oxygen storage level of a catalyst within a catalytic converter coupled to an engine comprising the steps of:

obtaining an expression for the mass of oxygen flowing into the catalytic converter, wherein the expression includes the term $(\lambda_{inlet}-1)/\lambda_{inlet}$ where $\lambda_{inlet}$ is equal to a normalized air/fuel ratio;

applying a rate modifier to the expression to obtain an oxygen storage rate to continuously calculate the oxygen storage level of the catalyst;

comparing the oxygen storage level to a predetermined threshold value, which provides positive and negative oxygen deviation values; and responding to a positive oxygen deviation value by decreasing an air/fuel ratio into the engine, and responding to a negative oxygen deviation value by increasing the air/fuel ratio into the engine.

2. The method of claim 1, wherein the step of continuously calculating the oxygen storage level further comprises the steps of:

receiving signals from a first gas sensor positioned upstream from the catalytic converter and a second gas sensor positioned downstream from the catalytic converter; and integrating the oxygen storage rate over a time interval to produce an estimate of the oxygen storage level, wherein the oxygen.

3. The method of claim 1, wherein the step of responding to a positive oxygen deviation value comprises the steps of:

computing a difference between the oxygen storage level of the catalyst and a target value;

applying a proportional gain to the difference;

determining an offset factor; and decreasing the air/fuel ratio by the offset factor.

4. The method of claim 1, wherein the step of responding to a negative oxygen deviation value comprises the steps of:

computing a difference between the amount of oxygen stored by the catalyst and a target value;

applying a proportional gain to the difference;

determining an offset factor; and increasing the air/fuel ratio by the offset factor.

5. A method for controlling the oxygen storage level of a catalyst within a catalytic converter coupled to an engine comprising the steps of:

monitoring a mass air flow rate into the engine and a first air/fuel ratio signal from a first gas sensor positioned upstream from the catalytic converter and a second air/fuel ratio signal from a second gas sensor positioned downstream from the catalytic converter;

generating an estimate of the oxygen storage level of the catalyst by:

continuously calculating an oxygen storage level, a rich adaptation parameter, and a lean adaptation parameter in a series of iterations, wherein values for the oxygen storage level, and the rich and the lean adaptation parameters calculated in a previous iteration are stored in a memory:

providing an expression for the mass of oxygen flowing into the catalytic converter, wherein the expression includes the term $(\lambda_{inlet}-1)/\lambda_{inlet}$ where $\lambda_{inlet}$ is equal to a normalized air/fuel ratio:

providing a rate modifier;

multiplying the expression by the rate modifier: and integrating the expression over a predetermined time interval to produce an estimate of the oxygen storage level of the catalyst; and comparing the estimate with a desired oxygen storage level and generating an oxygen error value;

analyzing the oxygen error value to produce an offset value;

comparing the first air/fuel ratio signal with a desired air/fuel ratio and generating an air/fuel ratio error value;

applying the offset value to the air/fuel error value and generating a compensation value; and adjusting the mass fuel flow rate into the engine by the compensation value.

6. The method of claim 5, wherein the step of analyzing the oxygen error value comprises the steps of:

providing an oxygen storage capacity value;

multiplying the oxygen storage capacity value by the desired oxygen storage level to produce a target value;

subtracting the estimate of the oxygen storage level from the target value to produce a compensation value; and applying a proportional gain to the compensation value to produce the offset value.

7. The method of claim 5, wherein the step of providing a rate modifier comprises the steps of:

monitoring the first air/fuel ratio signal to detect a rich condition; and calculating a rich rate modifier using the rich adaptation parameter and the oxygen storage level from the previous iteration.

8. The method of claim 5, wherein the step of providing a rate modifier comprises the steps of:

monitoring the first air/fuel ratio signal to detect a lean condition; and calculating a lean rate modifier using the lean adaptation parameter and the oxygen storage level from the previous iteration.

9. A method for controlling the oxygen storage level of a catalyst within a catalytic converter coupled to an engine comprising the steps of:

receiving signals from an MAP sensor, a first gas sensor positioned upstream from the catalytic converter, and a second gas sensor positioned downstream from the catalytic converter;

using the signals to compute values for a pumping delay time and for an exhaust system transport delay;

determining a computed oxygen storage level of the catalyst using an expression for the mass of oxygen flowing into the catalytic converter, wherein the expression includes the term $(\lambda_{inlet}-1)/\lambda_{inlet}$ where $\lambda_{inlet}$ is equal to a normalized air/fuel ratio, and wherein the stored values for the pumping delay time and the exhaust system transport delay are applied to the expression and wherein a rate modifier is applied to the expression;

comparing the computed oxygen storage level to a predetermined threshold value, which provides positive and negative oxygen deviation values; and responding to a positive oxygen deviation value by decreasing an air/fuel ratio into the engine, and responding to a negative oxygen deviation value by increasing the air/fuel ratio into the engine.

10. The method of claim 9, wherein the step of applying a rate modifier comprises the steps of:

monitoring the signals to detect rich and lean air/fuel ratios;

continuously calculating an oxygen storage level, a rich adaptation parameter, and a lean adaptation parameter in a series of iterations;

calculating a rich rate modifier using the rich adaptation parameter and the oxygen storage level from a previous iteration;

calculating a lean rate modifier using the lean adaptation parameter and the oxygen storage level from the previous iteration; and multiplying expression by the rich rate modifier where a rich fuel/air ratio is detected, and multiplying expression by the lean rate modifier where a lean fuel/air ratio is detected.

11. The method of claim 9, wherein the step of responding to a positive oxygen deviation value comprises the steps of:

computing a difference between the oxygen storage level of the catalyst and a target value;

applying a proportional gain to the difference;

determining an offset factor; and decreasing the air/fuel ratio by the offset factor.

12. The method of claim 11, wherein the step of determining an offset factor comprises the steps of:

determining a maximum value for the offset factor; and limiting the offset factor to a value less than the maximum value.

13. The method of claim 9, wherein the step of responding to a negative oxygen deviation value comprises the steps of:

computing a difference between the amount of oxygen stored by the catalyst and a target value;

applying a proportional gain to the difference;

determining an offset factor; and increasing the air/fuel ratio by the offset factor.

14. The method of claim 13, wherein the step of determining an offset factor comprises the steps of:

determining a maximum value for the offset factor; and limiting the offset factor to a value less than the maximum value.

* * * * *

UNITED STATES PATENT AND TRADEMARK OFFICE
CERTIFICATE OF CORRECTION

PATENT NO.   : 5,842,340
DATED        : December 21, 1998
INVENTOR(S)  : Bush et al.

It is certified that error appears in the above-indentified patent and that said Letters Patent is hereby corrected as shown below:

Column 14, line 62 reads "receiving signals from an MAP sensor, " should be -- receiving signals from an MAF sensor, --.

Signed and Sealed this

Eleventh Day of May, 1999

*Attest:*

Q. TODD DICKINSON

*Attesting Officer*     *Acting Commissioner of Patents and Trademarks*